(12) United States Patent
Lee et al.

(10) Patent No.: US 11,860,958 B2
(45) Date of Patent: Jan. 2, 2024

(54) METHOD AND DEVICE OF PROVIDING INTEGRATED SEARCH SERVICE

(71) Applicant: SAMSUNG ELECTRONICS CO., LTD., Suwon-si (KR)

(72) Inventors: Haejun Lee, Suwon-si (KR); Jongyoub Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 17/671,864

(22) Filed: Feb. 15, 2022

(65) Prior Publication Data

US 2022/0237244 A1    Jul. 28, 2022

Related U.S. Application Data

(63) Continuation of application No. PCT/KR2022/001504, filed on Jan. 27, 2022.

(30) Foreign Application Priority Data

Jan. 27, 2021   (KR) ........................ 10-2021-0011804

(51) Int. Cl.
  *G06F 16/00*   (2019.01)
  *G06F 16/9532*   (2019.01)
  (Continued)

(52) U.S. Cl.
  CPC ........ *G06F 16/9532* (2019.01); *G06F 16/168* (2019.01); *G06F 16/9535* (2019.01); *G06F 16/9537* (2019.01); *G06F 16/9538* (2019.01)

(58) Field of Classification Search
  CPC .................................................. G06F 16/168
  See application file for complete search history.

(56) References Cited

U.S. PATENT DOCUMENTS 7,725,447 B2   5/2010   Subramaniam et al.
9,177,022 B2   11/2015   Taranov et al.
(Continued)

FOREIGN PATENT DOCUMENTS

KR   10-2009-0080682   7/2009
KR   10-2011-0085995   7/2011
(Continued)

OTHER PUBLICATIONS

Search Report and Written Opinion dated May 11, 2022 issued in International Patent Application No. PCT/KR2022/001504.

*Primary Examiner* — Ajith Jacob
(74) *Attorney, Agent, or Firm* — Nixon & Vanderhye, P.C.

(57) ABSTRACT

Provided are a method and device for providing an integrated search service. The method may include: determining a search word based on a text string, determining a common graphical user interface (GUI) template based on the search word, obtaining a plurality of search results retrieved based on the search word, categorizing the plurality of search results into a plurality of search result groups including a first search result group and a second search result group, displaying the common GUI template on a first region of a display among a plurality of regions of the display, and displaying summary information of the search results included in the first search result group and summary information of the search results included in the second search result group in the common GUI template displayed on the first region of the display.

15 Claims, 13 Drawing Sheets

(51) Int. Cl.
*G06F 16/9538* (2019.01)
*G06F 16/9535* (2019.01)
*G06F 16/9537* (2019.01)
*G06F 16/16* (2019.01)

(56) References Cited

U.S. PATENT DOCUMENTS

| | | |
|---|---|---|
| 9,189,549 B2 | 11/2015 | Rubinstein et al. |
| 9,558,274 B2 | 1/2017 | Holm et al. |
| 9,992,066 B2 | 6/2018 | Zhao et al. |
| 10,585,942 B2 | 3/2020 | Ramer et al. |
| 11,080,323 B2 | 8/2021 | Shin et al. |
| 2007/0245260 A1* | 10/2007 | Koppert .................. G06F 16/34 715/810 |
| 2009/0187548 A1 | 7/2009 | Ji et al. |
| 2010/0114874 A1 | 5/2010 | Hansson et al. |
| 2012/0078897 A1 | 3/2012 | Kohanim et al. |

FOREIGN PATENT DOCUMENTS

| | | |
|---|---|---|
| KR | 10-2014-0074421 | 6/2014 |
| KR | 10-2015-0143971 | 12/2015 |

\* cited by examiner

| Sun | Mon | Tue | Wed | Thu | Fri | Sat |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 ☀ | 18 ☀ | 19 🌧 | 20 ☁ — 810 |
| 21 LOWEST PRICE :12,320 | 22 LOWEST PRICE :11,750 | 23 LOWEST PRICE :10,180 | 24 LOWEST PRICE :13,760 | 25 | 26 | 27 [RESERVE] — 820, 825 |
| 28 | 29 | 30 |  |  |  |  |

800

830, 835

METHOD AND DEVICE OF PROVIDING INTEGRATED SEARCH SERVICE

CROSS-REFERENCE TO RELATED APPLICATIONS

This application is a continuation of International Application No. PCT/KR2022/001504 designating the United States, filed on Jan. 27, 2022, in the Korean Intellectual Property Receiving Office and claiming priority to Korean Patent Application No. 10-2021-0011804, filed on Jan. 27, 2021, in the Korean Intellectual Property Office, the disclosures of which are incorporated by reference herein in their entireties.

BACKGROUND

Field

The disclosure relates to a method and device for providing an integrated search service with respect to search results of a variety of categories by obtaining search results corresponding to a plurality of search categories from a search word determined based on a text string received from a user.

Description of Related Art

In recent years, as computers, electronics, and Internet communication technology have rapidly developed, various communication services using a wireless communication network are being provided. Among various applications of devices, various web browsers for assisting users to use the Internet may display content loaded from a web server on a display of a device. A user may view a web page on a web browser and thereafter browse other web pages or new web pages. It is one of the main purposes that users browse the web to search for content and various search engines are being provided to users to search for content.

Techniques related to various search services have been suggested to provide a search result matching a user's search intention according to a search request from the user. In particular, in recent years, research is being actively conducted into an answer providing system for analyzing a user's natural language query and providing a best answer result.

Generally, when users retrieve information through a search engine, the search engine transmits a list of standardized information to all the users through a standard user interface (UI). In general, a search result through the search engine includes only a search result with respect to a search word corresponding to a query entered by a user.

In order to provide a good-quality search service, it is necessary to provide not only a search word input directly by a user but also other search words associated with the input search word. Although there are search engines that provide a list of associated search words corresponding to a search word entered by a user, the user may feel inconvenienced in applying a control signal, e.g., clicking a corresponding search word from among the list of associated search words, to obtain a search result corresponding to an associated search word. When moved to a search result window for the association search word, a search result with respect to a previously entered search word disappears.

Therefore, there is a need for a technique for providing a search result with respect to a search word input directly by a user and a search result with respect to an associated search word to be viewed at a glance more quickly.

SUMMARY

Embodiments of the disclosure may provide a search result with respect to an extended search word to provide not only a search result with respect to a search word corresponding to a text string input directly by a user but also search results of different categories with respect to search words associated with the text string (associated search words).

Embodiments of the disclosure may display search results of various categories in combination in one graphical user interface (GUI) template so that various types of information may be provided to be viewed at a glance within a screen of a display.

Embodiments of the disclosure are not limited to the aforementioned technical features, and other unstated technical problems may be inferred from embodiments below.

According to an example embodiment of the disclosure, a method of providing an integrated search service by a device includes: determining a search word from a text string obtained from a user, determining a common graphical user interface (GUI) template from the search word, obtaining a plurality of search results retrieved from the search word, categorizing the plurality of search results into a plurality of search result groups including a first search result group and a second search result group, displaying the common GUI template on a first region among a plurality of regions of a display, and displaying summary information of the search results included in the first search result group and summary information of the search results included in the second search result group in the common GUI template displayed on the first region.

According to an example embodiment of the disclosure, a device configured to provide an integrated search service includes: an inputter comprising input circuitry configured to obtain a text string, an outputter comprising output circuitry including a display configured to display information related to at least one search result, a storage storing a program including one or more instructions, and at least one processor configured to execute the one or more instructions stored in the storage. The at least one processor is further configured to: determine a search word from the text string, determine a common graphical user interface (GUI) template from the search word, obtain a plurality of search results retrieved from the search word, categorize the plurality of search results into a plurality of search result groups including a first search result group and a second search result group, control the display to display the common GUI template on a first region among a plurality of regions of a display, and control the display to display summary information of the search results included in the first search result group and summary information of the search results included in the second search result group in the common GUI template displayed on the first region.

According to an example embodiment of the disclosure, a non-transitory computer-readable recording medium having recorded thereon a program which, when executed by a processor causes an electronic device to perform operations corresponding to the disclosed method.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a diagram illustrating an example of displaying a search result on a display according to various embodiments;

FIG. 8 is a diagram illustrating an example calendar type common graphical user interface (GUI) template and summary information of a search result displayed in the common GUI template according to various embodiments;

DETAILED DESCRIPTION

Figure 1:
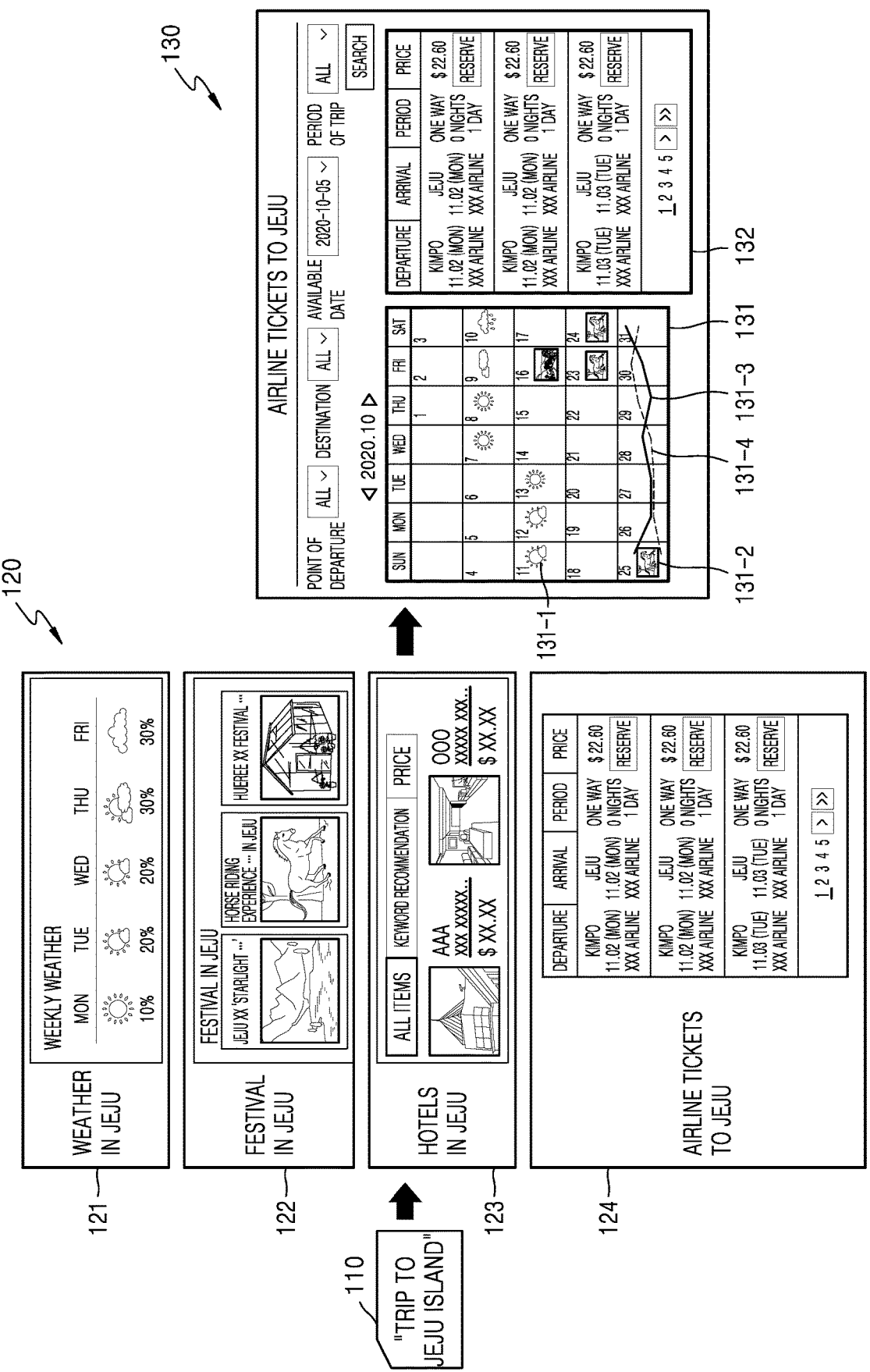
FIG. 1 is a diagram illustrating an example method of providing an integrated search service according to various embodiments.

Throughout the disclosure, the expression "at least one of a, b or c" indicates "a", "b", "c", "a and b", "a and c", "b and c", "all of a, b, and c", or variations thereof.

Hereinafter, various example embodiments of the disclosure will be described in detail with reference to the accompanying drawings. However, the disclosure may be embodied in many different forms and is not limited to the embodiments set forth herein. For clarity, parts not related to explaining the disclosure may be omitted in the drawings, and like components are denoted by like reference numerals throughout the specification.

In embodiments of the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily selected, and in this case, the meanings of these terms will be explained in corresponding parts of embodiments in detail. Accordingly, the terms used herein should be defined not based on the names thereof but based on the meanings thereof and the whole context of the disclosure.

As used herein, the singular expressions are intended to include plural forms as well, unless the context clearly dictates otherwise. Terms used herein, including technical or scientific terms, may have the same meaning as commonly understood by those of ordinary skill in the technical field described herein.

Throughout the disclosure, it will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Throughout the disclosure, when an element is referred to as being "connected" to another element, it will be understood to include that the element is "directly connected" to the other element or is "electrically connected" to the other element with another element therebetween. It will be understood that when an element is referred to as "including" another element, the element may further include other elements unless mentioned otherwise.

The expression "configured to" used herein may be interchangeably used, for example, "suitable for", "having the capacity to", "designed to", "adapted to", "made to", or "capable of", depending on a situation. The expression "configured to" may not be necessarily understood only as "specifically designed to" in terms of hardware. Instead, in some situations, the expression "system configured to ~" may be understood to refer to the system "to be configured to ~" together with other devices or components. For example, the phrase "processor configured to perform A, B, and C" may be understood to refer, for example, to a dedicated processor (e.g., an embedded processor) for performing a corresponding operation or a generic-purpose processor (e.g., a CPU or an application processor) capable of executing one or more software programs stored in a memory to perform corresponding operations.

Hereinafter, the disclosure will be described in greater detail with reference to the accompanying drawings.

FIG. 1 is a diagram illustrating an example method of providing an integrated search service according to various embodiments.

Referring to FIG. 1, a device may obtain a text string 110 from a user. The text string 110 may be a word or phrase with respect to data to be retrieved, which a user enters to a search window of a search site, to request a service request. In an embodiment of the disclosure, when the text string 110 is obtained from the user, the device may use a natural language processing (NLP) technique to determine a search word (keyword) from the text string 110.

For example, the device may obtain the text string 110, e.g., "trip to Jeju Island", from the user. The device may determine a search word from the text string 110 obtained from the user and obtain a plurality of search results retrieved with respect to the search word. For example, the search word may be 'Jeju Island, trip', and the plurality of search results may include information related to the 'trip to Jeju Island'. In an embodiment of the disclosure, the plurality of search results may be categorized into a plurality of search result groups. In an embodiment of the disclosure, the plurality of search results may be categorized into a plurality of search result groups, based on a category representing properties.

Referring to FIG. 1, according to an embodiment of the disclosure, the plurality of search results may be categorized into four search result groups 120. The four search result groups 120 may correspond to different categories. For example, a first search result group 121 may be a 'weather' category, and search results included in the first search result group 121 may include information related to the weather. A second search result group 122 may be a 'festival' or 'event' category, and search results included in the second search result group 122 may include information related to events or festivals occurring in Jeju island. A third search result group 123 may be a 'hotel' category, and search results included in the third search result group 123 may include information related to hotels in Jeju Island. A fourth search result group 124 may be an 'airline ticket' category, and search results included in the fourth search result group 124 may include information related to flights arriving at or departing from Jeju Island.

In an embodiment of the disclosure, the device may determine a common graphical user interface (GUI) template 131 for displaying information related to the search results included in the plurality of search result groups 120. The common GUI template 131 may be a GUI template for displaying information about the search results included in the plurality of search result groups 120 corresponding to different categories, and may be displayed on a region of a display 130 of the device. Referring to FIG. 1, the plurality of search result groups 120 may include the first search result group 121, the second search result group 122, the third search result group 123, and the fourth search result group 124. In an embodiment of the disclosure, the common GUI template 131 for displaying the information related to the search results included in the first to fourth search result groups 121 to 124 may be determined as a calendar-type GUI template.

In an embodiment of the disclosure, the common GUI template 131 may be determined prior to categorizing the plurality of search results according to a category. For example, the common GUI template 131 may be determined from a search word. The common GUI template 131 may be determined according to a search purpose of a search word determined based on a text string obtained from a user. For example, when a user's search purpose is determined to be 'plan a trip', the common GUI template 131 may be determined as a 'calendar' type GUI template for setting a schedule so that the user may plan a trip more effectively. Search results of a variety of categories such as airline tickets, hotels, the weather, and events may be displayed directly or summarized and displayed in the determined calendar-type common GUI template.

In an embodiment of the disclosure, the device may display the determined common GUI template 131 on a first region among a plurality of regions of the display 130. Referring to FIG. 1, the device may display summary information 131-1, 131-2, 131-3, and 131-4 of the search results included in the plurality of search result groups 120 in the common GUI template 131 displayed on the first region. In an embodiment of the disclosure, the summary information 131-1, 131-2, 131-3, and 131-4 of the search results included in the plurality of search result groups 120 may be displayed in the common GUI template 131 in the form of at least one of an icon, a button, text, or a graph.

For example, the device may display the summary information 131-1 of the search results (weather information) included in the first search result group 121 in the form of an icon in the common GUI template 131. The summary information 131-1 of the search results included in the first search result group 121 may represent weather information on a certain date in the common GUI template 131 of a calendar type. For example, the device may display the summary information 131-2 of the search results (event (festival) information) included in the second search result group 122 in the form of an icon in the common GUI template 131. The summary information 131-2 of the search results included in the second search result group 122 may represent an event occurring or a festival held on a certain date in the common GUI template 131 of a calendar type. The device may display the summary information 131-3 of the search results (hotel information) included in the third search result group 123 in the form of a graph in the common GUI template 131. The summary information 131-3 of the search results included in the third search result group 123 may represent information about a tendency of rates per night at a certain hotel or an average rate per night of hotels available in the common GUI template 131 of a calendar type. The device may display the summary information 131-4 of the search results (airline ticket information) included in the fourth search result group 124 in the form of a graph in the common GUI template 131. The summary information 131-4 of the search results included in the fourth search result group 124 may represent information about a tendency of a single fare of an airline ticket departing at a certain time period or an average single fare of airline tickets bookable at a certain date in the common GUI template 131 of a calendar type.

The summary information 131-1, 131-2, 131-3, and 131-4 of the search results included in the plurality of search result groups 120 is not limited to the above-described embodiment and may be displayed in various forms in the common GUI template 131.

In an embodiment of the disclosure, the device may select a search result group from among the plurality of search result groups 120 and display detailed information 132 of the search results included in the selected search result group on a second region among the plurality of regions of the display 130. Referring to FIG. 1, for example, the device may select the fourth search result group 124 from among the plurality of search result groups 120, and display detailed information 132 of the search results (airline ticket information) included in the fourth search result group 124 on the second region of the display 130. In an embodiment of the disclosure, a category name (e.g., "airline ticket to Jeju') of the search result group 124 corresponding to the detailed information 132 displayed on the second region of the display 130 may be further displayed on the display 130.

As described above, according to an embodiment of the disclosure, search results of various categories may be displayed in combination in one common GUI template 131 so that various information may be provided to be viewed at a glance within a screen of the display 130.

Figure 2A:
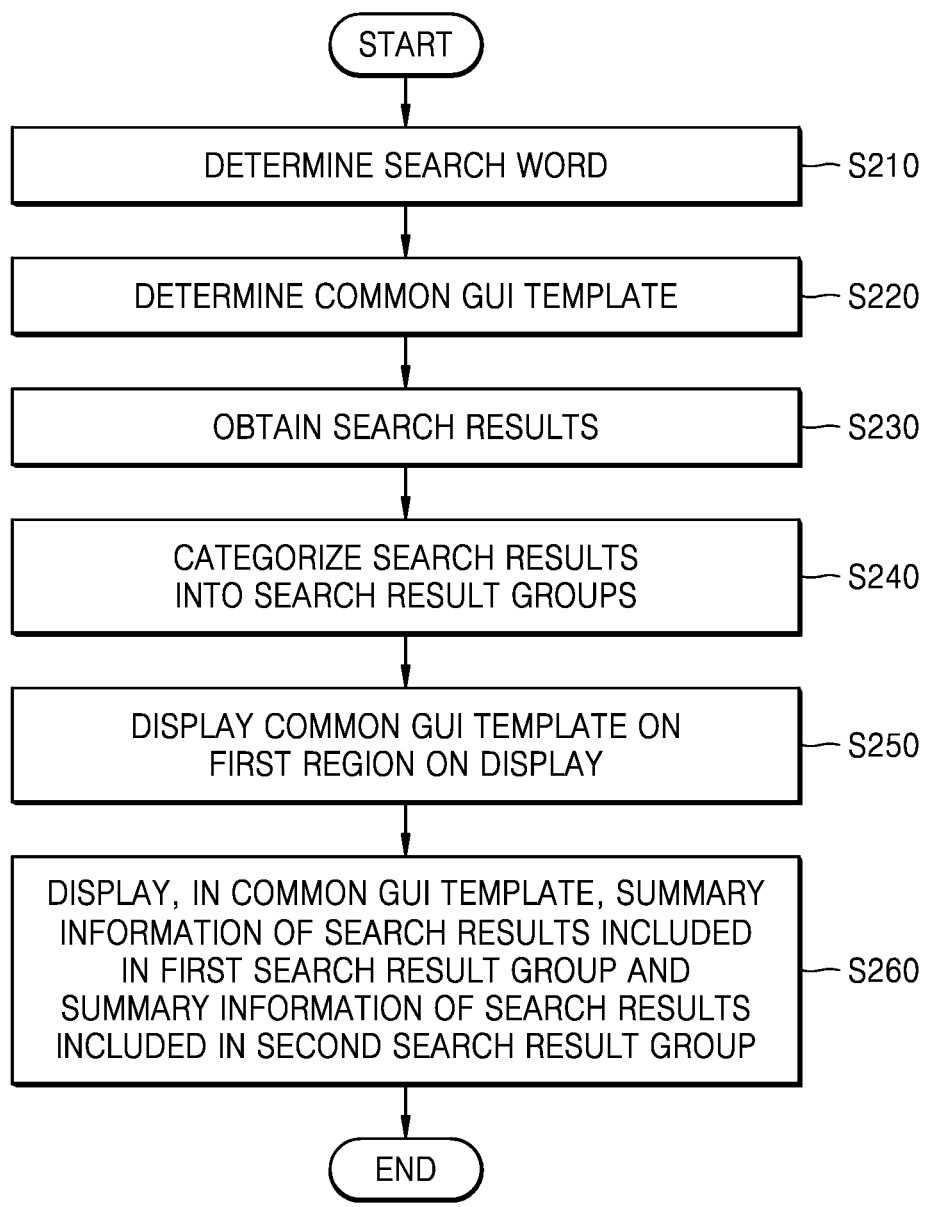
FIG. 2A is a flowchart illustrating an example method of providing an integrated search service according to various embodiments.

FIG. 2A is a flowchart illustrating an example method of providing an integrated search service according to various embodiments.

In operation S210, a device may determine a search word (keyword) from a text string obtained from a user. The text string may be a word or phrase for data to be retrieved, which is entered by a user to a search window of a search site to request a search service. The search word may be determined from the text string obtained from the user.

In operation S220, the device may determine a common GUI template from the determined search word. For example, the common GUI template may be determined according to a search purpose of the search word determined based on the text string obtained from the user.

The determining of the common GUI template from the search word may include identifying a plurality of search categories from the search word, determining GUI template lists corresponding to the plurality of search categories, and determining, as a common GUI template, a GUI template having a highest priority among GUI templates included in the GUI template lists or determining a certain GUI template, as a common GUI template, when the number of GUI template lists including the certain GUI template is greatest. In an embodiment of the disclosure, a GUI template list corresponding to a certain search category may include at least one GUI template appropriate for displaying search results included in the search category. For example, a GUI template may be in a form for displaying various types of information, such as a calendar, a graph, a list, and a map, as a user interface (UI).

For example, a plurality of search categories may include a first search category and a second search category. In this case, determining, by the device, a common GUI template for displaying information related to search results included in the first search category and the second search category may include determining a first GUI template list corresponding to the first search category, determining a second GUI template list corresponding to the second search category, and determine as a common GUI template a GUI template having a highest priority among GUI templates included in both the first and second GUI template lists.

In an embodiment of the disclosure, determining, by the device, a common GUI template for displaying information related to search results included in the first search category and the second search category may include determining a plurality of GUI template lists corresponding to a plurality of search categories, and determining as a common GUI template a GUI template included in a largest number of GUI template lists among the plurality of GUI template lists.

The determining of the common GUI template is not limited to the above-described methods and a GUI template appropriate for displaying search results of various categories may be determined as a common GUI template.

In operation S230, the device may obtain a plurality of search results retrieved from the determined search word. In an embodiment of the disclosure, the plurality of search results may be received from a service provider (SP). In an embodiment of the disclosure, the SP may be embodied as a search server outside the device. The SP may obtain a search result from the search word and transmit the obtained search result to the device. In an embodiment of the disclosure, the SP may rank the search result and transmit the search result to the device.

In an embodiment of the disclosure, the obtaining of the plurality of search results retrieved from the search word may include obtaining an extended search word from the determined search word and obtaining a plurality of search results retrieved from the extended search word. In an embodiment of the disclosure, the extended search word may be a high-level search word including a search word determined based on a user input. For example, the extended search word may be a word or a phrase including a concept of the search word determined based on the user input. For example, when a search word obtained from a user is 'airline ticket to Jeju', an expanded search word may be 'trip to Jeju Island'.

In an embodiment of the disclosure, a set of categories corresponding to a plurality of search results retrieved from an extended search word may include categories corresponding to a plurality of search results retrieved from the search word determined based on the user input. For example, the plurality of search results retrieved from the extended search word may include a plurality of search results retrieved from the search word determined based on the user input.

In an embodiment of the disclosure, a search word obtained from a user may be a broad term including a plurality of categories. In this case, search results including a plurality of categories may be obtained from the search word, and an integrated search service categorized and displayed according to the categories of the search results may be provided to the user. In an embodiment of the disclosure, the search word obtained from the user may be a term of a narrow range corresponding to a single category. In this case, an extended search word corresponding to a term of a super ordinate concept including a concept of the search word may be obtained, search results including a plurality of categories may be obtained from the expanded search word, and an integrated search service categorized and displayed according to the categories of the search results may be provided to the user.

In an embodiment of the disclosure, a predetermined knowledge representation model may be used to obtain an extended search word from a search word obtained from a user. A knowledge representation model will be described in more detail with reference to FIG. 5 to be described below.

In operation S240, the device may categorize the plurality of search results into a plurality of search result groups including a first search result group and a second search result group. In an embodiment of the disclosure, the plurality of search results may be categorized into a plurality of search result groups, based on a search category. The search category of the search results may represent properties of the search results. In an embodiment of the disclosure, two different search result groups may be generated from a first search category and a second search category, which are different from each other. For example, a first search result group may be generated from search results included in the first search category, and a second search result group may be generated from search results included in the second search category.

In operation S250, the device may display the determined common GUI template on a first region among a plurality of regions of a display. The first region may be at least a region of a screen of the display. In an embodiment of the disclosure, the screen of the display may include a first region for displaying a common GUI template and a second region for displaying detailed information of at least a part of search results.

In an embodiment of the disclosure, the device may select a search result group from among a plurality of search result groups and display detailed information of search results included in the selected search result group on the second region on the display. For example, the selecting of a search result group from among the plurality of search result groups may include selecting a search result group having a highest priority, based on priorities of the plurality of search result groups or selecting a search result group, based on a user input.

For example, the selecting of a search result group from among the plurality of search result groups may include selecting a search result group, based on a user input to select summary information of the search results included in the first search result group displayed on the first region or summary information of the search results included in the second search result group displayed on the second region. In an embodiment of the disclosure, the summary information of the search results may be displayed in the form of at least one of an icon, a button, text, or a graph, and the user input to select the summary information of the search results included in the first search result group or the summary information of the search results included in the second search result group may include clicking or tapping a part of the displayed summary information.

In operation S260, the device may display summary information of the search results included in the plurality of search result groups in a common GUI template displayed on the first region on the display. For example, the device may display the summary information of the search results included in the first search result group and the summary information of the search results included in the second search result group in the common GUI template displayed on the first region on the display. In an embodiment of the disclosure, summary information of search results included in a plurality of search result groups may be displayed in the common GUI template in the form of at least one of an icon, a button, text, or a graph. In an embodiment of the disclosure, information included in the summary information of the search results included in the plurality of search result groups may be determined based on at least one of search service providing history information, user information, importance of a search result, environmental information, or a screen size of a display.

As described above, according to an embodiment of the disclosure, a search result with respect to an extended search word may be provided to provide not only a search result corresponding to a search word input directly by a user but also a search result with respect to an associated search word. In addition, a variety of information may be provided to be viewed at a glance within a screen of a display by displaying search results of various categories in combination in a GUI template.

Figure 2B:
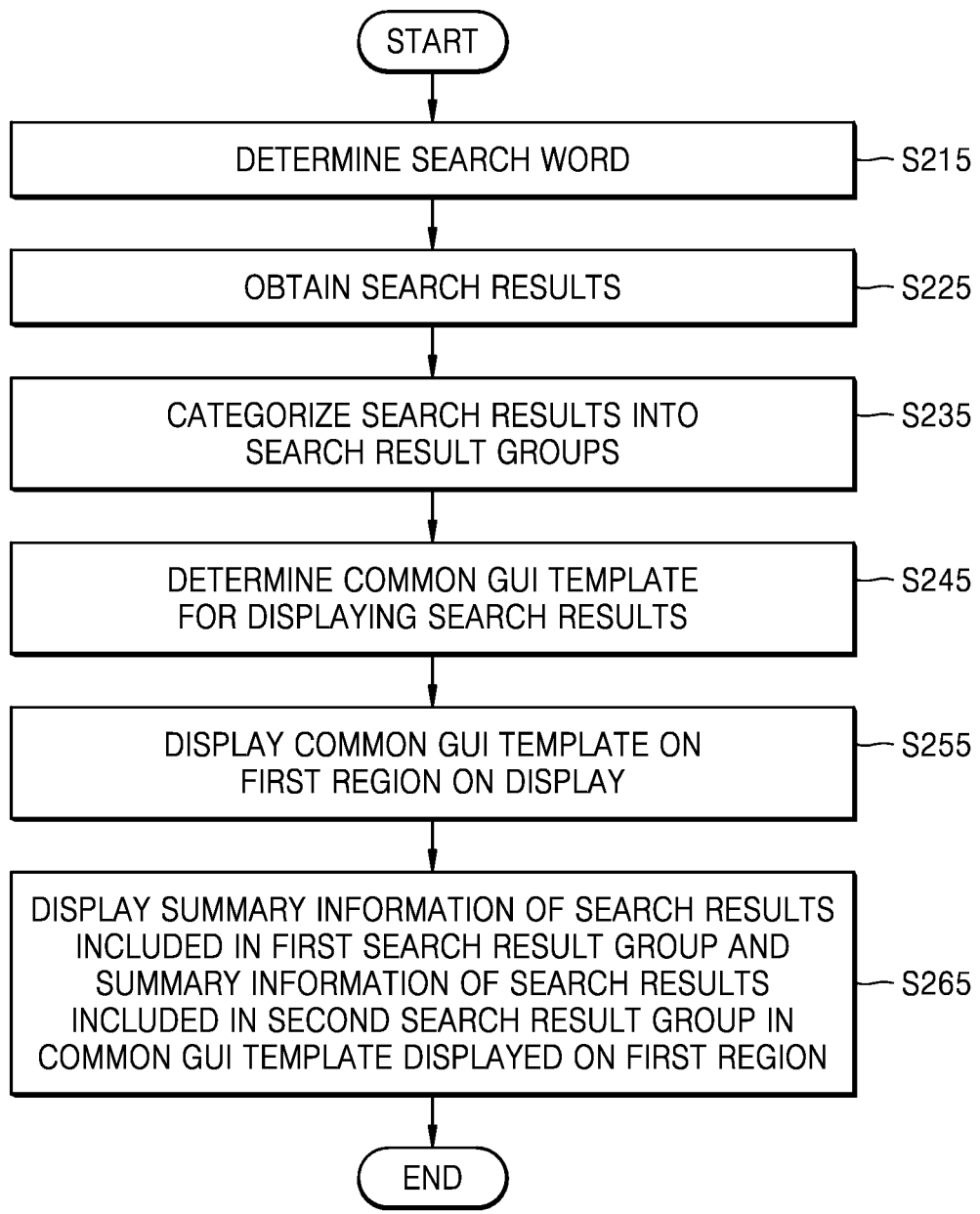
FIG. 2B is a flowchart illustrating an example method of providing an integrated search service according to various embodiments.

FIG. 2B is a flowchart illustrating an example method of providing an integrated search service according to various embodiments.

In operation S215, a device may determine a search word (keyword) from a text string obtained from a user. Operation S215 may be performed similar to operation S210 of FIG. 2A.

In operation S225, the device may obtain a plurality of search results retrieved from the determined search word. Operation S225 may be performed similar to operation S230 of FIG. 2A.

In operation S235, the device may categorize the plurality of search results into a plurality of search result groups including a first search result group and a second search result group. Operation S235 may be performed similar to operation S240 of FIG. 2A.

In operation S245, the device may determine a common GUI template for displaying information related to the search results included in the first and second search result groups. In an embodiment of the disclosure, determining a common GUI template for displaying information related to search results included in a plurality of search result groups may include determining GUI template lists corresponding to the plurality of search result groups, and determining as a common GUI template a GUI template having a highest priority among GUI templates included in the plurality of GUI template lists or determining a certain GUI template as a common GUI template when the number of GUI template lists including the GUI template is largest. In an embodiment of the disclosure, a GUI template list corresponding to a certain search result group may include at least one GUI template appropriate for displaying search results included in the search result group. For example, a GUI template may be in a form for displaying various types of information, such as a calendar, a graph, a list, and a map, as a UI.

For example, the plurality of search result groups may include a first search result group and a second search result group. In this case, the determining, by the device, of the common GUI template for displaying the information related to the search results included in the first search result group and the second search result group may include determining a first GUI template list corresponding to the first search result group, determining a second GUI template list corresponding to the second search result group, and determining as a common GUI template a GUI template having a highest priority among GUI templates included in both the first and second GUI template lists.

In an embodiment of the disclosure, the determining, by the device, of the common GUI template for displaying the information related to the search results included in the first search result group and the second search result group may include determining a plurality of GUI template lists corresponding to a plurality of search result groups, and determining as a common GUI template a GUI template included in a largest number of GUI template lists among the plurality of GUI template lists.

The determining of the common GUI template is not limited to the above-described methods and a GUI template appropriate for displaying search results of various categories may be determined as a common GUI template.

When FIGS. 2A and 2B are compared with each other, in an embodiment of the disclosure, determining a common GUI template may be performed before or after categorizing the plurality of search results according to a category.

In operation S255, the device may display the determined common GUI template on a first region among a plurality of regions of a display. The first region may be at least a region of a screen of the display. In an embodiment of the disclosure, the screen of the display may include a first region for displaying a common GUI template and a second region for displaying detailed information of at least a part of search results. Operation S255 may be performed similarly to operation S250 of FIG. 2A.

In operation S265, the device may display summary information of the search results included in the plurality of search result groups in the common GUI template displayed on the first region on the display. For example, the device may display the summary information of the search results included in the first search result group and the summary information of the search results included in the second search result group in the common GUI template displayed on the first region on the display. Operation S255 may be performed similar to operation S260 of FIG. 2A.

Hereinafter, in an embodiment of the disclosure, determining a common GUI template for displaying search results and categorizing a plurality of search results into a plurality of search results according to a category may be performed in various orders, and a 'search result group' into which search results are categorized according to a category may be used in a sense similar to a 'search category'.

Figure 3:
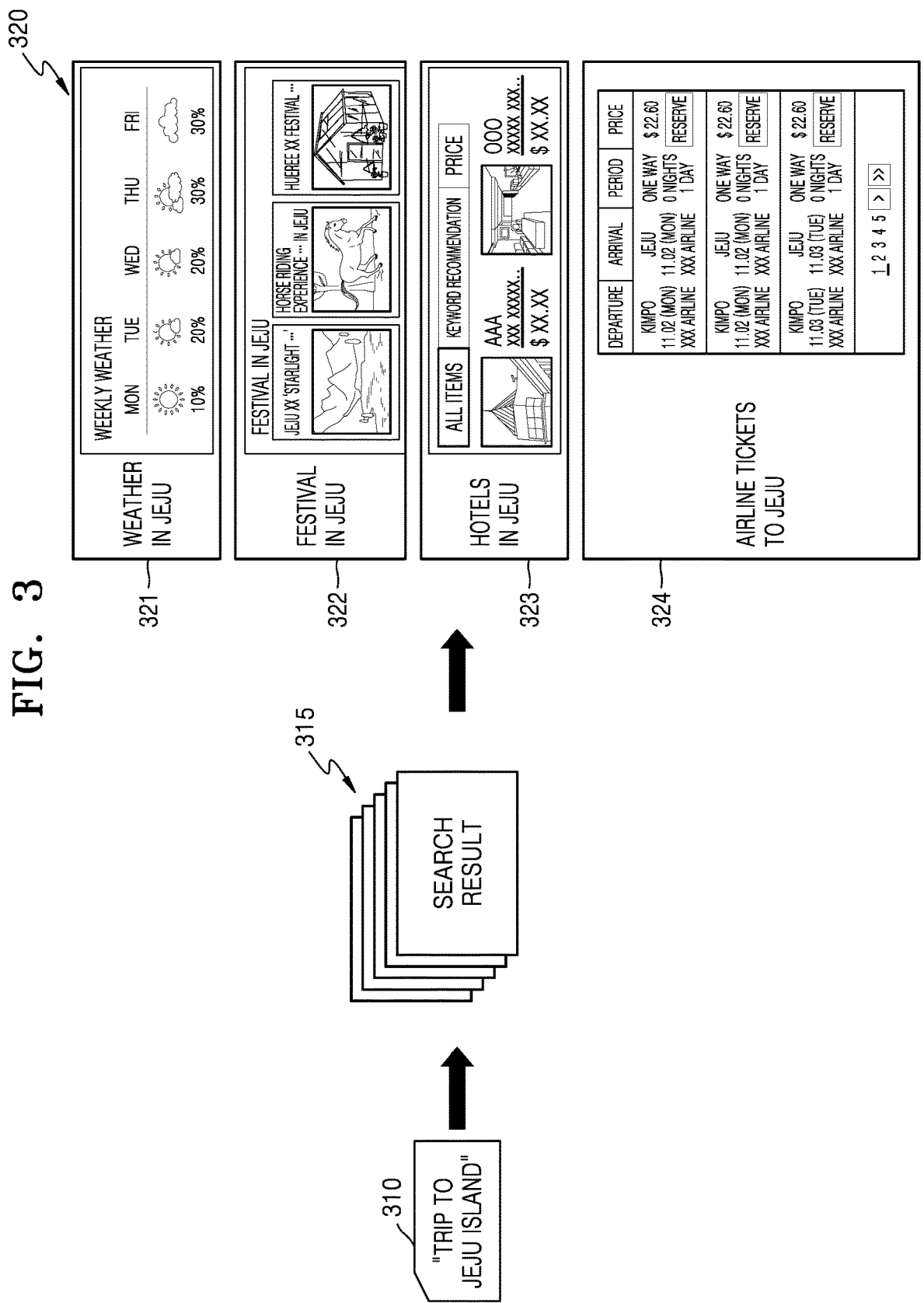
FIG. 3 is a diagram illustrating an example of categorizing a plurality of search results into a plurality of search result groups according to various embodiments.

FIG. 3 is a diagram illustrating an example of categorizing a plurality of search results 315 into a plurality of search result groups 320 according to various embodiments.

Referring to FIG. 3, a device may obtain a plurality of search results 315 retrieved from a search word determined from a text string 310 obtained from a user. For example, the device may obtain the text string 310, e.g., "trip to Jeju Island", from the user. The device may determine a search word 'trip to Jeju Island' from the obtained text string 310, and obtain the plurality of search results 315 retrieved with respect to the 'trip to Jeju Island'.

In an embodiment of the disclosure, the plurality of search results may be received from an SP (service provider). In an embodiment of the disclosure, the SP may be embodied as a search server outside the device. The SP may obtain a search result from the search word and transmit the obtained search result to the device. In an embodiment of the disclosure, the SP may rank the search result and transmit the search result to the device.

In an embodiment of the disclosure, the plurality of search results 315 may correspond to various categories. In an embodiment of the disclosure, the plurality of search results 315 may be categorized into the plurality of search result groups 320. In an embodiment of the disclosure, the plurality of search results 315 may be categorized into the plurality of search result groups 320, based on the search categories corresponding thereto. The categories of the search results 315 may represent properties of the search results 315.

In an embodiment of the disclosure, two different search result groups may be generated from a first category and a second category, which are different from each other. For example, a first search result group may be generated from search results included in the first category, and a second search result group may be generated from search results included in the second category.

Referring to FIG. 3, in an embodiment of the disclosure, the plurality of search results 315 may correspond to four categories. In this case, the plurality of search results 315 may be categorized into four search result groups 320. The four search result groups 320 may correspond to different categories.

For example, the device may identify first search results corresponding to a 'weather' category among the plurality of search results 315. The first search results may include information related to the weather. For example, the first search results may include information related to a rainfall probability, precipitation, air volume, maximum temperature, minimum temperature, or the like corresponding to a certain date. The first search result group 321 may be determined from the identified first search results.

For example, the device may identify second search results corresponding to a 'festival' or 'event' category among the plurality of search results 315. The second search results may include information related to events or festivals occurring in Jeju Island. For example, the second search results may include information related to a date, a place, time, or an admission fee of an event. A second search result group 322 may be determined from the identified second search results.

For example, the device may identify third search results corresponding to a 'hotel' category among the plurality of search results 315. The third search results may include information related to hotels in Jeju Island. For example, the third search results may include information related to dates on which a certain hotel can be reserved, accommodation fees, the location of the hotel, or ratings of the hotel, etc. A third search result group 323 may be determined from the identified third search results.

For example, the device may identify fourth search results corresponding to an 'airline ticket' category among the plurality of search results 315. The fourth search results may include information related to times of flights arriving at or departing from Jeju Island, fares, whether flights can be reserved, or an affiliate airline. A fourth search result group 324 may be determined from the identified fourth search results.

As described above, the device may obtain the plurality of search results 315 corresponding to the plurality of categories from the determined search word. The device may provide the plurality of search results 315 corresponding to the plurality of categories in combination to a user to provide an integrated search service.

Figure 4:
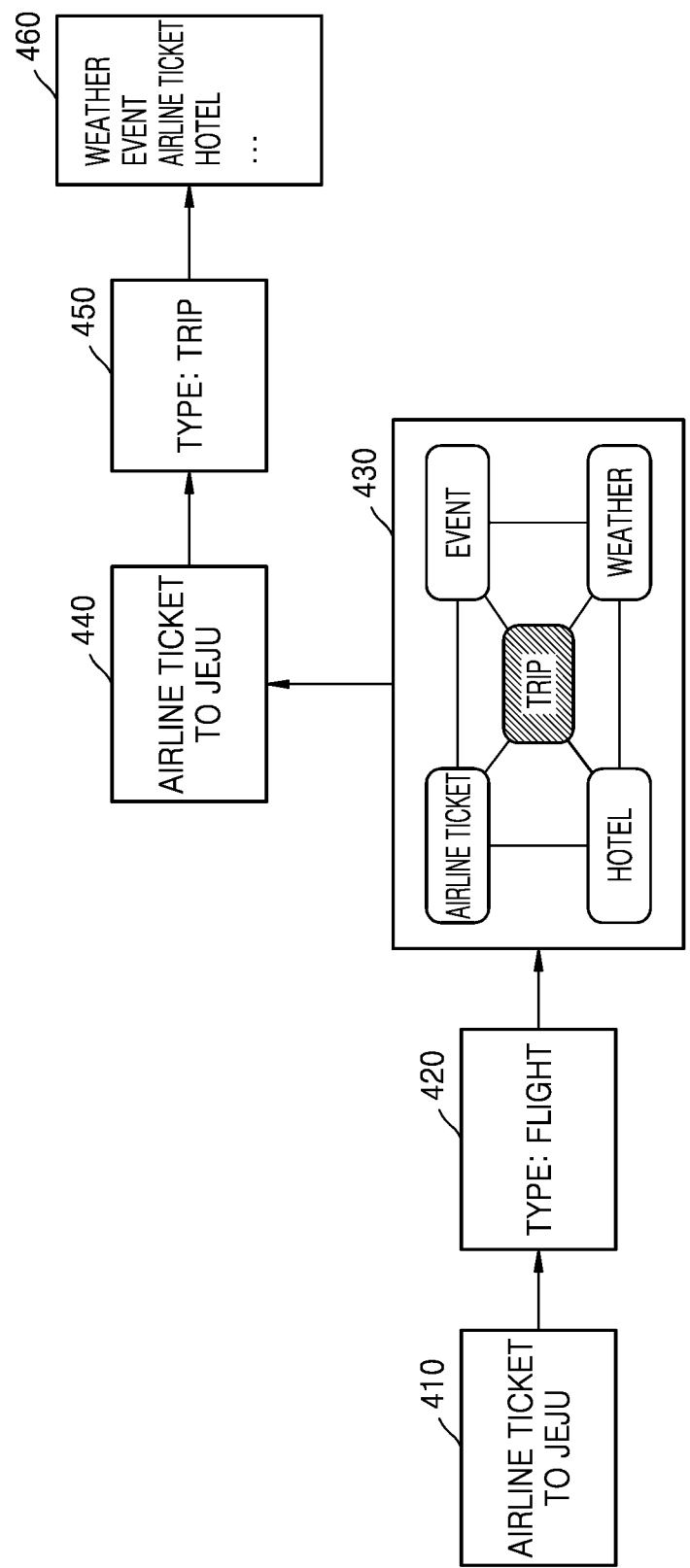
FIG. 4 is a diagram illustrating an example of obtaining an extended search word from a search word according to various embodiments.

FIG. 4 is a diagram illustrating an example of obtaining an extended search word 440 from a search word 410 according to an embodiment of the disclosure.

Referring to FIG. 4, a device may obtain the search word 410, e.g., 'airline ticket to Jeju', from a user input. In an embodiment of the disclosure, the device may obtain the extended search word 440 from the search word 410 determined based on a text string obtained from a user, and obtain a plurality of search results corresponding to a plurality of categories 460 from the extended search word 440.

In an embodiment of the disclosure, the extended search word 440 may correspond to a high-level search word including the search word 410 determined based on a text string obtained from a user. For example, the extended search word 440 may be a word or a phrase including a concept of the search word 410 obtained from the user. For example, when the search word 410 determined from the user input is 'airline ticket to Jeju', the extended search word 440 may be 'trip to Jeju Island' associated with an airline ticket. In an embodiment of the disclosure, a set of categories 460 corresponding to a plurality of search results retrieved from the extended search word 440 may include categories corresponding to a plurality of search results retrieved from the search word 410 determined based on the user input. For example, the plurality of search results retrieved from the extended search word 440 may include a plurality of search results retrieved from the search word 410 determined based on the user input.

In an embodiment of the disclosure, the device may directly obtain the extended search word 440, e.g., 'trip to Jeju Island' from the user. The extended search word 440 may be a search word including concepts associated with a plurality of categories. When the extended search word 440 obtained from the user is a term corresponding to a plurality of categories, search results including the plurality of categories may be obtained from the extended search word 440 and an integrated search service categorized and displayed according to the categories of the search results may be provided to the user.

In an embodiment of the disclosure, a predetermined knowledge representation model 430 may be used to obtain the extended search word 440 from the determined search word 410. The knowledge representation model 430 may store knowledge required for contextualization in a generalized form. For example, the knowledge representation model 430 may include information about the relationship between entities, attribute information of the entities, etc.

In an embodiment of the disclosure, the knowledge representation model 430 may be predetermined and stored in the device. In an embodiment of the disclosure, the knowledge representation model 430 may be personalized by a pattern of a search service request from a certain user, preference information of the user, etc.

Referring to FIG. 4, the device may determine a category type 420 corresponding to the determined search word 410. For example, when the search word 410, e.g., 'airline ticket to Jeju', is determined from a user input, the category type 420 corresponding thereto may be determined as 'flight'. The device may obtain the extended search word 440 from the determined category type 420 by using a knowledge representation model personalized for the user or a global knowledge representation model. For example, associated categories (event, hotel, weather, etc.) may be identified from a 'flight' category by using the knowledge representation model 430, and a 'trip', which is a property of a super ordinate concept including the determined category type 420 and the associated categories, may be derived. 'trip to Jeju Island', which is the extended search word 440, may be obtained, based on the property of the derived super ordinate concept.

The device may obtain a plurality of search results retrieved from the obtained extended search word 440. In an embodiment of the disclosure, the device may determine a property 450 of the extended search word 440. For example, the property 450 of 'trip to Jeju Island', which is the extended search word 440, may be determined as 'trip'. The obtaining of the plurality of search results retrieved from the extended search word 440 may be performed similarly to operation S220 of FIG. 2 described above. For example, search results including the plurality of categories 460 may be obtained from the extended search word 440, and an integrated search service categorized and displayed according to the categories of the search results may be provided to the user.

Figure 5:
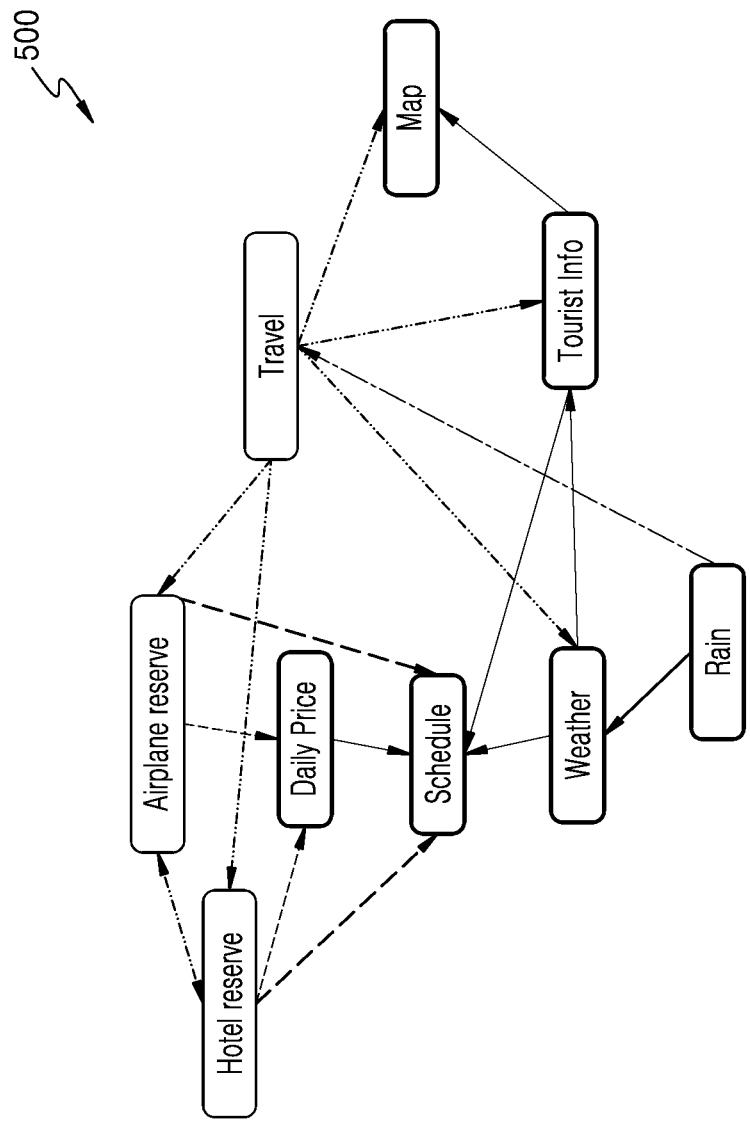
FIG. 5 is a diagram illustrating an example knowledge representation model according to various embodiments.

FIG. 5 is a diagram illustrating an example knowledge representation model according to various embodiments.

Referring to FIG. 5, the knowledge representation model may include a schematized knowledge graph 500. The knowledge graph 500 may be a set of structured information including nodes and edges connecting the nodes, and may be a knowledge base structurally representing a relation between the nodes. The knowledge graph 500 may be generated by hierarchically representing the nodes and the relation between the nodes and may have a triple structure in which the nodes are connected through the edges. A node value corresponding to a node may indicate an entity, and an edge value corresponding to an edge may represent a relation or a property. The knowledge graph 500 may be embodied as a language representing ontology, e.g., a resource description framework (RDF), an RDF schema (RDF-S), or an ontology web Language (OWL), but is not limited thereto.

The knowledge representation model including the knowledge graph 500 may be used to obtain an extended search word determined from a user input or combine search results corresponding to a plurality of categories. For example, when a search word corresponding to a search category such as 'hotel', 'airline ticket', or 'event' is determined from a user input, the device may identify other associated categories by using the knowledge graph 500 included in the knowledge representation model, and determine a property ('trip' or the like) of a super ordinate concept including the category corresponding to the search word and the identified associated categories.

In an embodiment of the disclosure, the knowledge representation model may be used to categorize a plurality of search results into a plurality of search result groups or combine search results corresponding to the plurality of categories to display the search results on a display. In an embodiment of the disclosure, the knowledge representation model may be predetermined and stored in the device. In an embodiment of the disclosure, the knowledge representation model may be personalized by a pattern of a search service request from a certain user, preference information of the user, etc.

Figure 6:
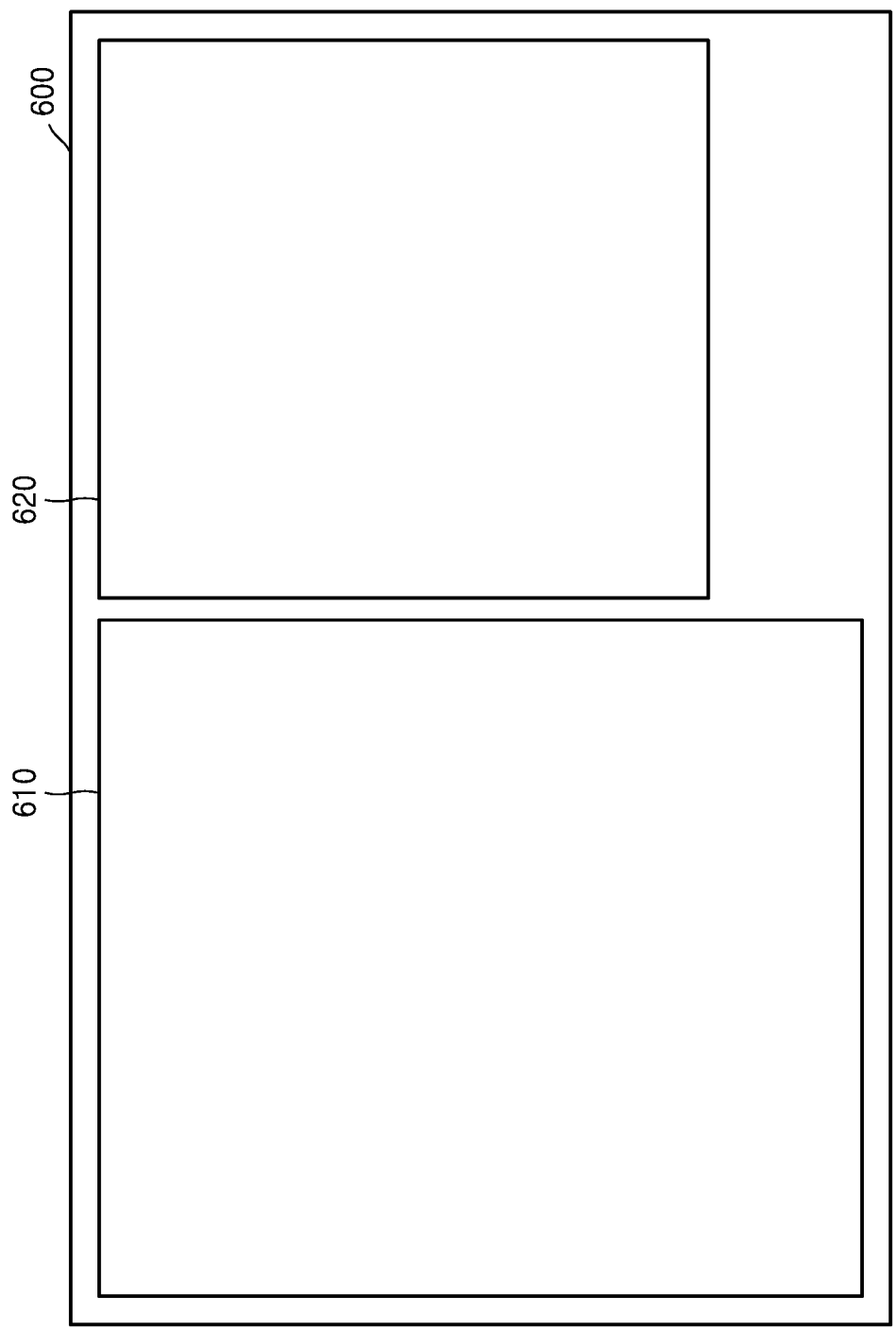
FIG. 6 is a diagram illustrating an example first region and second region among a plurality of regions on a display according to various embodiments.
Figure 7:
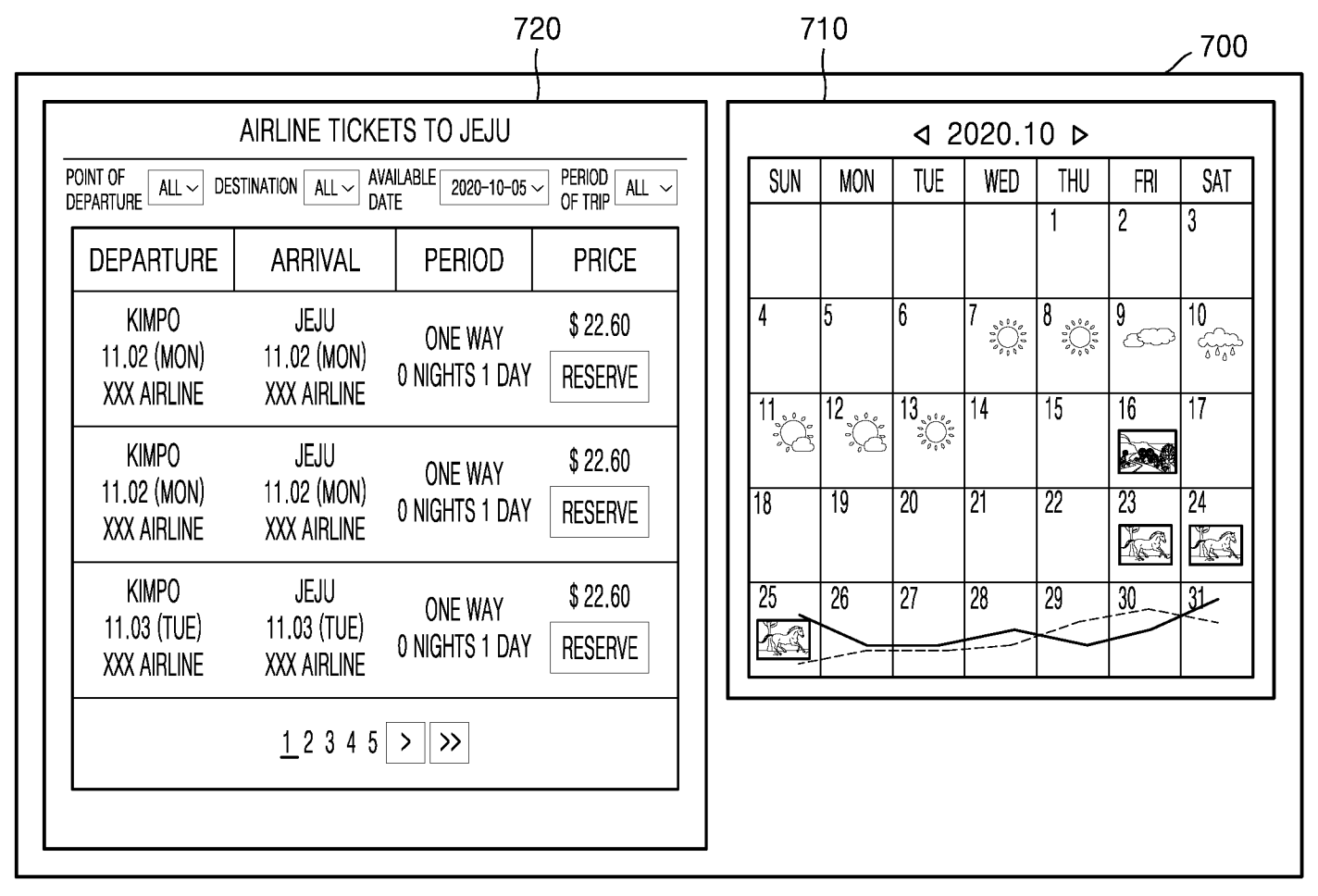

FIG. 6 is a diagram illustrating an example first region 610 and second region 620 among a plurality of regions on a display 600 according to various embodiments. FIG. 7 is a diagram illustrating an example of displaying a search result on a display 700 according to various embodiments.

Referring to FIG. 6, a screen of the display 600 may include the first region 610 and the second region 620 that are not consecutive to each other. In an embodiment of the disclosure, the first region 610 and the second region 620 may be different from each other in terms of an area or a shape. FIG. 6 is only an example, and an embodiment of the disclosure is not limited to a case in which the first region 610 is larger than the second region 620 or a case in which the first region 610 is at a left side of the second region 620.

In an embodiment of the disclosure, a common GUI template displaying summary information of search results corresponding to a plurality of categories may be displayed on the first region 610 among the plurality of regions on the display 600. In an embodiment of the disclosure, detailed information of search results included in at least one search result group may be displayed on the second region 620 among the plurality of regions on the display 600.

Referring to FIG. 7, a screen of the display 700 may include a first region 710 and a second region 720. In an embodiment of the disclosure, an area of the first region 710 may be smaller than that of the second region 720.

In an embodiment of the disclosure, a search result group, the summary information of which is to be displayed on the second region 720, may be selected according to a user input to click summary information displayed on the first region 710. For example, selecting a search result group among a plurality of search result groups may include selecting a search result group corresponding to a selected piece of summary information, based on a user input to select a piece of summary information among summary information of search results displayed on the first region 710. In an embodiment of the disclosure, the summary information of the search results may be displayed in the form of at least one of an icon, a button, text, or a graph, and the user input to select the summary information of the search results included in the first search result group or the summary information of the search results included in the second search result group may include clicking or tapping a part of the displayed summary information. In an embodiment of the disclosure, a search category or search result group having a highest priority may be selected as a search result group, the detailed information of which is to be displayed on the second region 720, based on priorities of plurality of search categories or priorities of a plurality of search result groups.

The common GUI template 131 of FIG. 1 described above may be displayed on the first region 710 of FIG. 7. Referring back to FIG. 1, a device may determine the common GUI template 131 for displaying information associated with the search results included in the plurality of search result groups 120. In an embodiment of the disclosure, determining a common GUI template for displaying information related to the search results included in the plurality of search result groups 120 may include determining GUI template lists corresponding to the plurality of search result groups 120, and determining as a common GUI template a GUI template having a highest priority among GUI templates included in the plurality of GUI template lists or determining a certain GUI template as a common GUI template when the number of GUI template lists including the GUI template is largest. In an embodiment of the disclosure, a GUI template list corresponding to a certain search result group may include at least one GUI template appropriate for displaying search results included in the search result group. For example, a GUI template may be in a form for displaying various types of information, such as a calendar, a graph, a list, and a map, as a UI.

For example, the plurality of search result groups 120 may include a first search result group and a second search result group. In this case, the determining, by the device, of the common GUI template for displaying the information related to the search results included in the first search result group and the second search result group may include determining a first GUI template list corresponding to the first search result group, determining a second GUI template list corresponding to the second search result group, and determining as a common GUI template a GUI template having a highest priority among GUI templates included in both the first and second GUI template lists.

Referring back to FIG. 1, the plurality of search result groups 120 may include the first search result group 121, the second search result group 122, the third search result group 123, and the fourth search result group 124. For example, a first GUI template list corresponding to the first search result group 121 may include templates that are in the form of calendar or map and arranged in order according to priority. A second GUI template list corresponding to the second search result group 122 may include templates that are in the form of list, calendar or map and arranged in order according to priority. A third GUI template list corresponding to the third search result group 123 may include templates that are in the form of a list, a map, or a graph and arranged in order according to priority. A fourth GUI template list corresponding to the fourth search result group 124 may include templates that are in the form of a list, a calendar, or a graph and arranged in order according to priority. For example, the plurality of GUI template lists corresponding to the plurality of search result groups 120 may be represented as follows.

TABLE 1

| | GUI template list | | | |
|---|---|---|---|---|
| | 1ST | 2ND | 3RD | 4TH |
| first search result group (category: weather) | calendar | map | — | — |
| second search result group (category: event) | list | calendar | map | — |
| third search result group (category: hotel) | list | map | graph | calendar |
| fourth search result group (category: airline ticket) | list | calendar | map | — |

In an embodiment of the disclosure, the common GUI template 131 for displaying the information related to the search results included in the first to fourth search result groups 121, 122, 123, and 124 may be determined as the calendar-type GUI template included in all of the first to fourth template lists.

In an embodiment of the disclosure, when there are a plurality of GUI templates redundantly included in a plurality of GUI template lists, a GUI template having a highest priority among the GUI templates may be determined as a common GUI template.

In an embodiment of the disclosure, when no GUI templates are redundantly included in a plurality of GUI template lists, a GUI template included in a largest number of GUI template lists may be determined as a common GUI template or a common GUI template may be determined considering priorities of all GUI templates.

The determining of the common GUI template is not limited to the above-described methods and a GUI template appropriate for displaying search results of various categories may be determined as a common GUI template.

In an embodiment of the disclosure, the device may display the determined common GUI template 131 on the first region 710 among the plurality of regions of the display 700. Referring to FIGS. 1 and 7, the device may display the summary information 131-1, 131-2, 131-3, and 131-4 of the search results included in the plurality of search result groups 120 in the common GUI template 131 displayed on the first region 710. In an embodiment of the disclosure, the summary information 131-1, 131-2, 131-3, and 131-4 of the search results included in the plurality of search result groups 120 may be displayed in the common GUI template 131 in the form of at least one of an icon, a button, text, or a graph.

In an embodiment of the disclosure, a range of information included in the summary information of the search results included in the plurality of search result groups 120 may be determined based on at least one of search service providing history information, user information, importance of a search result, environmental information, or a screen size of the display 700.

In an embodiment of the disclosure, the device may select a search result group from among the plurality of search result groups 120 and display detailed information of search results included in the selected search result group on the second region 720 on the display 700. Referring to FIGS. 1 and 7, for example, the device may select the fourth search result group 124 from among the plurality of search result groups 120, and display detailed information 132 of the search results (airline ticket information) included in the fourth search result group 124 on the second region 720 of the display 700. In an embodiment of the disclosure, a category name (e.g., "airline ticket to Jeju') of the fourth search result group 124 corresponding to the detailed information 132 displayed on the second region 720 may be further displayed on the display 700.

As described above, according to an embodiment of the disclosure, search results of various categories may be displayed in combination in one common GUI template so that various information may be provided to be viewed at a glance within the screen of the display 700.

FIG. 8 is a diagram illustrating an example calendar-type common GUI template 800 and summary information of a search result displayed in the calendar-type common GUI template 800 according to various embodiments.

In an embodiment of the disclosure, search results obtained by a device may be categorized into a first search result group included in a first category, which is a 'weather' category, a second search result group included in a second category, which is an 'event' category, and a third search result group included in a third category, which is an 'accommodation' category.

Referring to FIG. 8, summary information of the search results included in the first search result group, the second search result group, and the third search result group may be displayed in the calendar-type common GUI template 800. For example, the summary information of the search results included in the first search result group may be displayed as an icon 810 for briefly identifying weather information. The summary information displayed as the icon 810 corresponding to the weather may be displayed near a corresponding date on the calendar-type common GUI template 800. For example, the summary information of the search results included in the second search result group may be displayed as an icon 820 for briefly identifying event information and a button 825 linked to a ticket sales site of a corresponding event when the button 825 is clicked. The summary information displayed as the icon 820 and the button 825 corresponding to the event may be displayed near a corresponding date on the calendar-type common GUI template 800. For example, the summary information of the search results included in the third search result group may be displayed as a graph 830 for identifying a trend of change of prices of accommodations and text 835 for identifying lowest price information. The summary information displayed as the text 835 may be displayed near a corresponding date on the calendar-type common GUI template 800, and the summary information displayed as the graph 830 may be displayed on the calendar-type common GUI template 800 to correspond to a plurality of dates.

Figure 9:
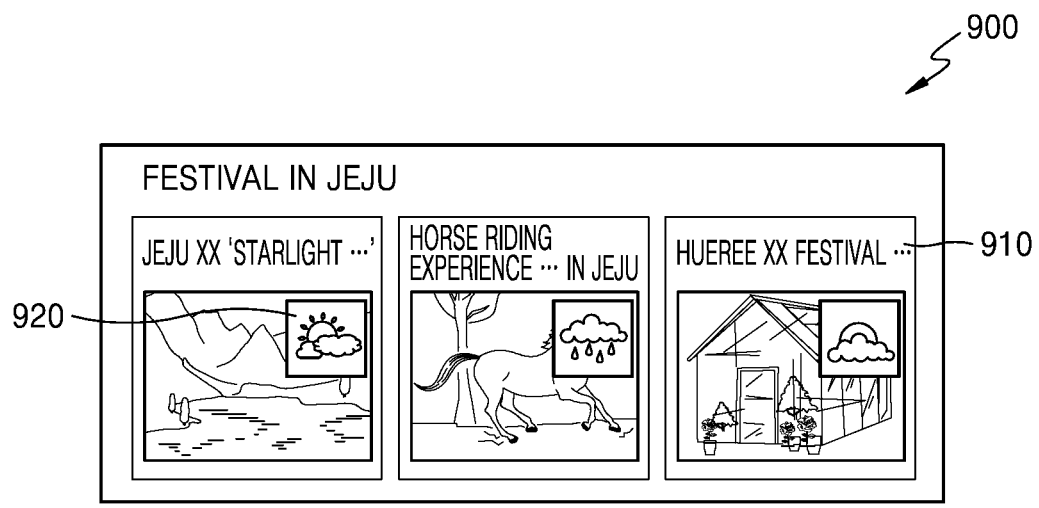
FIG. 9 is a diagram illustrating an example list type common GUI template and summary information of a search result displayed in the common GUI template according to various embodiments.

FIG. 9 is a diagram illustrating an example list-type common GUI template 900 and summary information of a search result displayed on the list-type common GUI template 900 according to various embodiments.

In an embodiment of the disclosure, search results obtained by a device may be categorized into a first search result group included in a first category, which is an 'event' category, and a second search result group included in a second category, which is a 'weather' category.

Referring to FIG. 9, summary information of the search results included in the first search result group and the second search result group may be displayed on the list-type common GUI template 900. For example, the summary information of the search results included in the first search result group may be displayed as an image 910 for briefly identifying event information. The summary information displayed as the image 910 corresponding to an event may be displayed on the list-type common GUI template 900. For example, the summary information of the search results included in the second search result group may be displayed as an icon 920 for briefly identifying weather information. The summary information displayed as the icon 920 corresponding to the weather may be displayed near a corresponding event on the list-type common GUI template 900. For example, weather information may include predicted weather information at a time when a certain event will occur, and summary information of the weather may be displayed at a location on the image 910 of the event.

Figure 10:
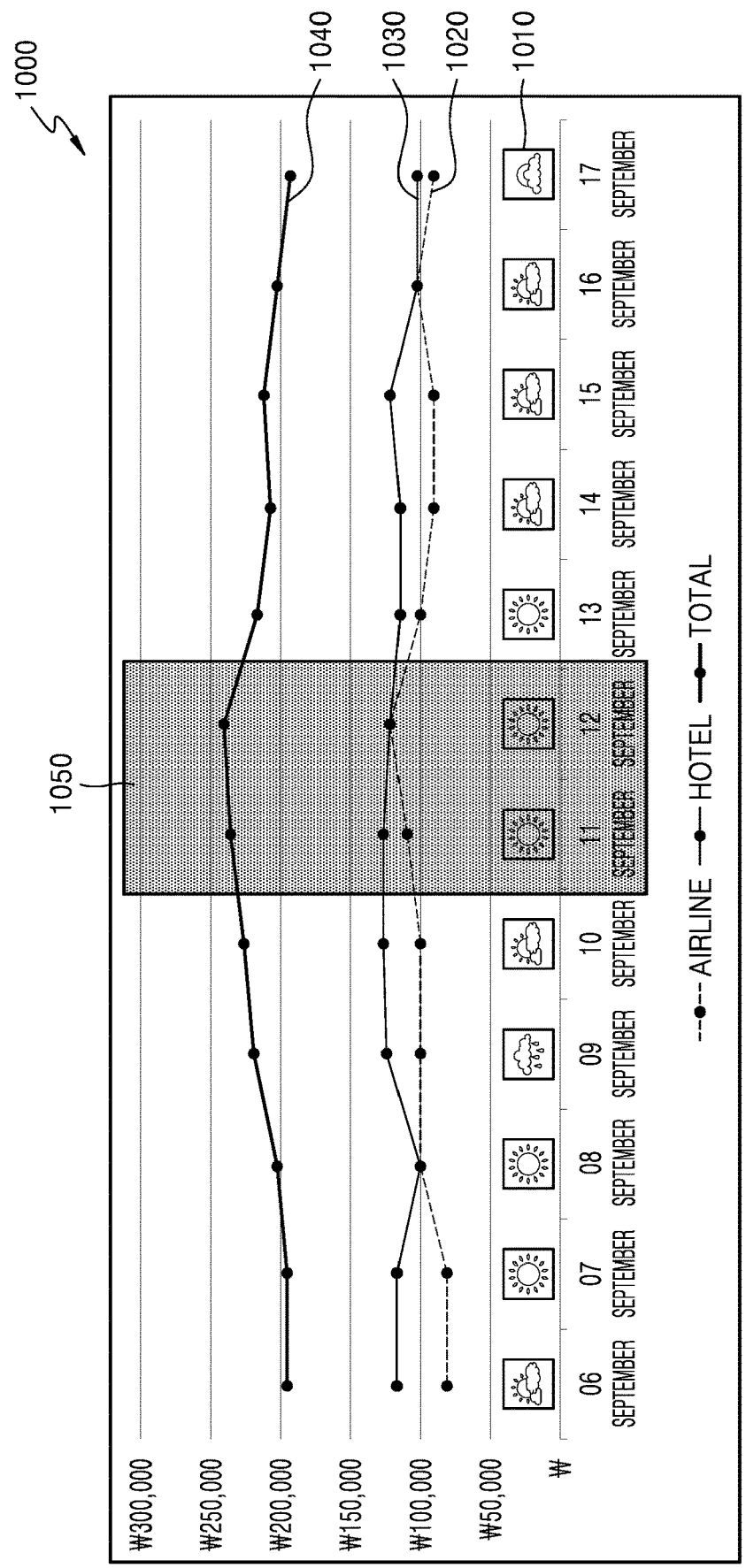
FIG. 10 is a diagram illustrating an example graph type common GUI template and summary information of a search result displayed in the common GUI template according to various embodiments.

FIG. 10 is a diagram illustrating an example graph-type common GUI template 1000 and summary information of a search result displayed in the graph-type common GUI template 1000 according to various embodiments.

In an embodiment of the disclosure, search results obtained by a device may be categorized into a first search result group included in a first category, which is a 'weather' category, a second search result group included in a second category, which is an 'airline ticket' category, and a third search result group included in a third category, which is an 'accommodation' category.

Referring to FIG. 10, summary information of the search results included in the first search result group, the second search result group, and the third search result group may be displayed in the graph-type common GUI template 1000. For example, the summary information of the search results included in the first search result group may be displayed as an icon 1010 for briefly identifying weather information. The summary information displayed as the icon 1010 corresponding to the weather may be displayed near a date corresponding to an x-axis on the graph-type common GUI template 1000. For example, the summary information of the search results included in the second search result group may be displayed as a graph 1020 for identifying a trend of change of prices of airline tickets, and the summary information of the search results included in the third search result group may be displayed as a graph 1030 for identifying a trend of change of prices of accommodations. In an embodiment of the disclosure, the device may additionally provide a user with an analysis result graph 1040 for expecting 'total necessary expenses' from a combination of the search results included in the second and third search result groups. In an embodiment of the disclosure, the device may additionally provide the user with information 1050 about recommended travel times.

Figure 11:
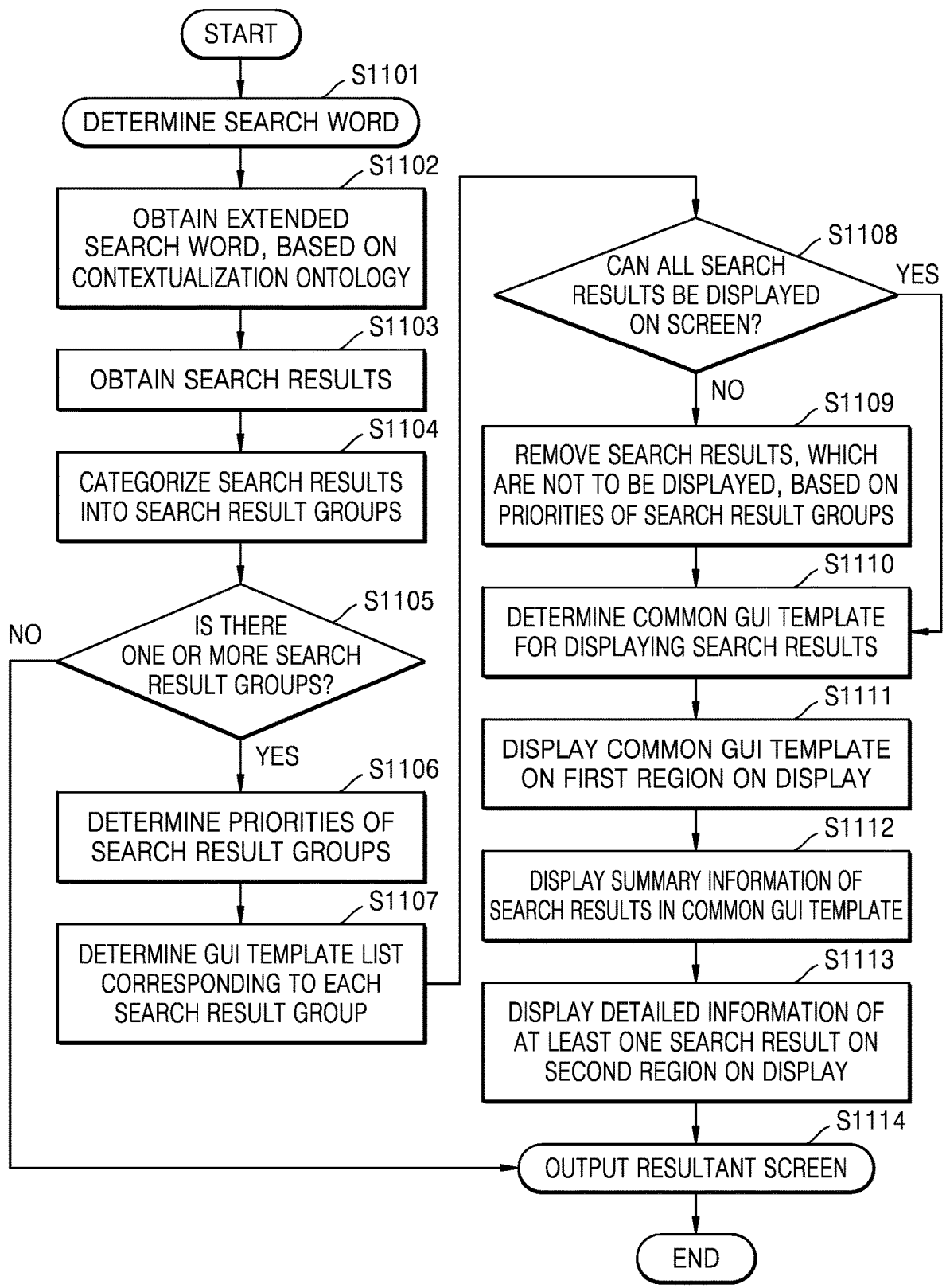
FIG. 11 is a flowchart illustrating an example method of providing an integrated search service according to various embodiments.

FIG. 11 is a flowchart illustrating an example method of providing an integrated search service according to various embodiments.

In operation S1101, a device may determine a search word from a user input. Operation S1101 may be performed similarly to operation S210 of FIG. 2A and operation S215 of FIG. 2B.

In operation S1102, the device may obtain an extended search word from the search word, based on a contextualization ontology. In an embodiment of the disclosure, the contextualization ontology may be a type of the knowledge representation model described above, and the obtaining of the extended search word from the search word determined in operation S1102 may be performed similarly to the obtaining of the extended search word 440 from the search word 410 described above with reference to FIG. 4.

In operation S1103, the device may obtain a plurality of search results retrieved from the extended search word. In an embodiment of the disclosure, the plurality of search results may be received from an SP. In an embodiment of the disclosure, the SP may be embodied as a search server outside the device. The SP may obtain a search result from the search word and transmit the obtained search result to the device. In an embodiment of the disclosure, the SP may rank the search result and transmit the search result to the device. Operation S1103 may be performed similarly to operation S230 of FIG. 2A and operation S225 of FIG. 2B.

In operation S1104, the device may categorize the plurality of search results into a plurality of search results according to a category. Operation S1104 may be performed similarly to operation S240 of FIG. 2A and operation S235 of FIG. 2B.

In operation S1105, the device may determine whether there is one or more search result groups. In an embodiment of the disclosure, when there is not one or more search result groups, it may indicate that there is no search result. In this case, the device may output a screen indicating that there is no search result. When there is one or more search result groups, it may indicate that there is a search result retrieved from the search word. In this case, the method may proceed to operation S1106.

In operation S1106, when there is one or more search result groups, the device may determine relative priorities of the one or more search result groups. In an embodiment of the disclosure, priorities of search result groups may be determined by information regarding the user, the user's search service request history, and the like.

In operation S1107, the device may determine a GUI template list corresponding to each of the one or more search result groups. In an embodiment of the disclosure, a GUI template list corresponding to a certain search result group may include at least one GUI template appropriate for displaying search results included in the search result group.

For example, a GUI template may be in a form for displaying various types of information, such as a calendar, a graph, a list, and a map, as a UI. In an embodiment of the disclosure, the determining of the GUI template list corresponding to each of the one or more search result groups may be performed similarly to the determining of a GUI template list corresponding to a certain search result group described above with reference to FIG. 1.

In operation S1108, the device may determine whether a preset number of search results can be displayed within a screen of a display. In an embodiment of the disclosure, the device may determine whether all search results can be displayed on the screen of the display. Whether all search results can be displayed within the screen of the display may be determined by a size of the screen of the display or the amount of the search results. In an embodiment of the disclosure, the method may proceed to operation S1110 when all the search results can be displayed within the screen of the display and may proceed to operation S1109 when all the search results cannot be displayed within the screen of the display.

In operation S1109, when all the search results cannot be displayed within the screen of the display, the device may select and remove search results, which are not to be displayed, based on the relative priorities of the plurality of search result groups.

In operation S1110, the device may determine a common GUI template for displaying search results remaining after removing the search results, which are not to be displayed, in operation S1109 or determine a common GUI template for displaying all the search results when all the search results can be displayed within the screen of the display. Operation S1110 may be performed similarly to operation S220 of FIG. 2A and operation S245 of FIG. 2B.

In operation S1111, the device may display the determined common GUI template on a first region on the display. The first region may be at least a region of the screen of the display. Operation S1111 may be performed similarly to operation S250 of FIG. 2A and operation S255 of FIG. 2B.

In operation S1112, the device may display summary information of the search results included in the plurality of search result groups in the common GUI template displayed on the first region on the display. For example, the device may display the summary information of the search results included in the first search result group and the summary information of the search results included in the second search result group in the common GUI template displayed on the first region on the display. In an embodiment of the disclosure, summary information of search results included in a plurality of search result groups may be displayed in the common GUI template in the form of at least one of an icon, a button, text, or a graph. In an embodiment of the disclosure, the summary information of the search results included in the plurality of search result groups may be determined based on at least one of search service providing history information, user information, importance of a search result, environmental information, or the screen size of the display. Operation S1112 may be performed similarly to operation S260 of FIG. 2A and operation S265 of FIG. 2B.

In operation S1113, the device may display detailed information of at least one search result on a second region on the display. In an embodiment of the disclosure, the screen of the display may include a first region for displaying a common GUI template and a second region for displaying detailed information of at least a part of search results. In an embodiment of the disclosure, the device may select a search result group from among a plurality of search result groups and display detailed information of search results included in the selected search result group on the second region on the display. For example, the selecting of a search result group from among the plurality of search result groups may include selecting a search result group having a highest priority, based on priorities of the plurality of search result groups or selecting a search result group, based on a user input. Operation S1113 may be performed similarly to the displaying of the detailed information of the search results included in the selected search result group on the display as described above with reference to FIG. 1.

In operation S1114, the device may output a resultant screen obtained by combining the search results retrieved from the search word on the display. As described above, according to an embodiment of the disclosure, a search result with respect to an extended search word may be provided to provide not only a search result corresponding to a search word determined from a user input but also a search result with respect to an associated search word, and search results of various categories may be displayed in combination in a GUI template to provide various information to be viewed at a glance within a screen of a display.

Figure 12:
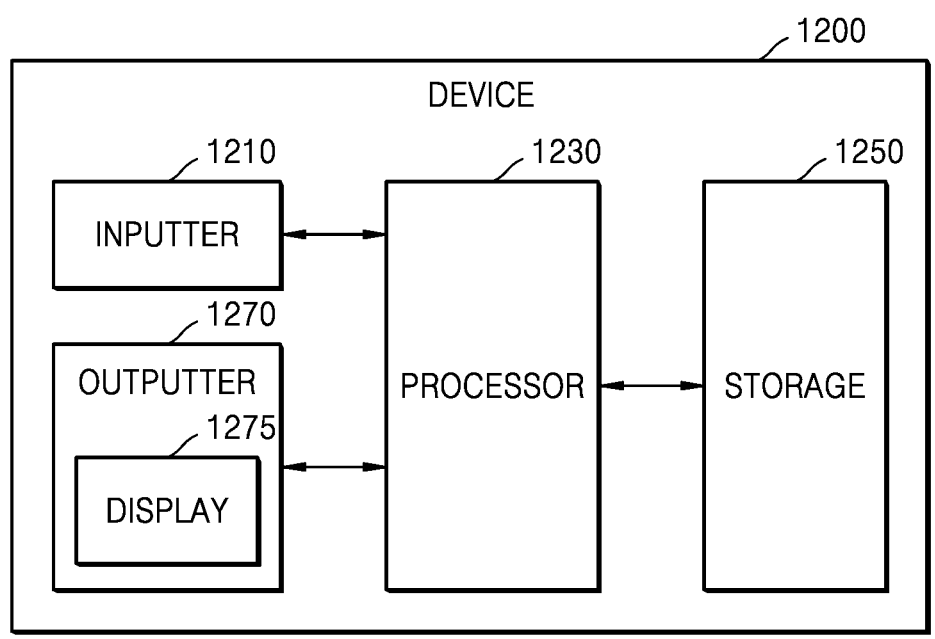
FIG. 12 is a block diagram illustrating an example configuration of a device according to various embodiments.

FIG. 12 is a block diagram illustrating an example configuration of a device 1200 according to various embodiments.

Referring to FIG. 12, the device 1200 may include an inputter (e.g., including input circuitry) 1210, an outputter (e.g., including output circuitry) 1270, a processor (e.g., including processing circuitry) 1230, and a storage 1250. However, all of the components illustrated in FIG. 12 are not essential components of the device 1200. The device 1200 may further include other components, as well as the components illustrated in FIG. 12, or may include only some of the components illustrated in FIG. 12.

The inputter 1210 may include various input circuitry and obtain a search word from a user. The inputter 1210 may also obtain various information, such as user information, environmental information, or a display size, from the user. The inputter 1210 may receive data for controlling the device 1200 from the user. Examples of the inputter 1100 may include, for example, but are not limited to, an input device such as a mouse or a keyboard, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad, or the like), a jog wheel, a jog switch, a communication module for communicating with other devices, etc.

The outputter 1270 may include various output circuitry and output a search result corresponding to a search word received from a user. In addition, the outputter 1270 may output recommendation information and analysis information from the search result. The outputter 1270 may include a display, a sound outputter, and a vibration motor.

The display 1275 may display information processed by the device 1200. For example, the display 1275 may display a UI for a user input. The display 1275 may output an output video or an output image to the outside. The display 1275 may display and output a visual image to the outside. In an embodiment of the disclosure, the display 1275 may include a panel. The display 1275 may include, for example, at least one of a liquid crystal display (LCD), a thin-film transistor-liquid crystal display (TFT-LCD), an organic light-emitting diode (OLED), a flexible display, a three-dimensional (3D) display, an electrophoretic display, or the like. However, the display 1275 is not limited to the above-described examples and may include all types of displays that output and display videos or images.

The sound outputter (not shown) may output audio data. The sound outputter may include a speaker, a buzzer, or the like. The vibration motor may output a vibration signal. For example, the vibration motor may output a vibration signal corresponding to an output of audio data or video data. The vibration motor may output a vibration signal when a touch is input to a touch screen.

The storage 1250 may store a program to be executed by the processor 1230, which is to be described below, to control an operation of the device 1200. The storage 1250 may store a program including at least one instruction for controlling an operation of the device 1200. The storage 1250 may store instructions and program codes readable by the processor 1230. In an embodiment of the disclosure, the processor 1230 may be embodied to execute instructions or codes of a program stored in the storage 1250. The storage 1250 may be data to be input to the device 1200 or data output from the device 1200.

The storage 1250 may include, for example, and without limitation, at least one type of storage medium among a flash memory, a hard disk, a multimedia card micro type storage medium, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like.

The processor 1230 may include various processing circuitry and control overall operations of the device 1200. The processor 1230 may perform operations according to an embodiment of the disclosure. For example, the processor 1230 may execute programs stored in the storage 1250 to generally control the inputter 1210, the outputter 1270, the display 1275, the storage 1250, and the like.

The processor 1230 may include hardware components that perform an arithmetic operation, a logic operation, input/output operations, and signal processing. The processor 1230 may include, but is not limited thereto, for example, at least one of a central processing unit, a microprocessor, a graphics processing unit, an application specific integrated circuit (ASIC), a digital signal processor (DSP), a digital signal processing device (DSPD), a programmable logic device (PLD), a field programmable gate array (FPGA), a dedicated processor, or the like.

In an embodiment of the disclosure, the processor 1230 may execute at least one instruction stored in the storage 1250 to determine a search word from a text string obtained from a user. The text string may be a word or phrase for data to be retrieved, which is entered by a user to a search window of a search site to request a search service.

In an embodiment of the disclosure, the processor 1230 may execute at least one instruction stored in the storage 1250 to obtain a plurality of search results retrieved from an obtained search word. In an embodiment of the disclosure, the plurality of search results may be received from an SP. In an embodiment of the disclosure, the SP may be embodied as a search server outside the device 1200. The SP may obtain a search result from a search word and transmit the obtained search result to the device 1200. In an embodiment of the disclosure, the SP may rank the search result and transmit the search result to the device 1200.

In an embodiment of the disclosure, obtaining a plurality of search results retrieved from a search word by the device 1200 may include obtaining an extended search word from a search word obtained from a user and obtaining a plurality of search results retrieved from the extended search word. In an embodiment of the disclosure, the extended search word may correspond to a high-level search word including a search word determined based on a user input. For example, the extended search word may correspond to a word or a phrase including a concept of the search word obtained from the user.

In an embodiment of the disclosure, a set of categories corresponding to a plurality of search results retrieved from an extended search word may include categories corresponding to a plurality of search results retrieved from the search word determined based on the user input. For example, the plurality of search results retrieved from the extended search word may include a plurality of search results retrieved from the search word determined based on the user input. In an embodiment of the disclosure, a predetermined knowledge representation model may be used to obtain an extended search word from a search word determined based on a user input.

In an embodiment of the disclosure, the processor 1230 may execute at least one instruction stored in the storage 1250 to categorize a plurality of search results into a plurality of search result groups including a first search result group and a second search result group. In an embodiment of the disclosure, the plurality of search results may be categorized into the plurality of search result groups, based on a category. Categories of the search results may represent properties of the search results. In an embodiment of the disclosure, two different search result groups may be generated from a first category and a second category, which are different from each other. For example, a first search result group may be generated from search results included in the first category, and a second search result group may be generated from search results included in the second category.

In an embodiment of the disclosure, the processor 1230 may execute at least one instruction stored in the storage 1250 to determine a common GUI template for displaying information related to the search results included in the first and second search result groups. In an embodiment of the disclosure, determining a common GUI template for displaying information related to search results included in a plurality of search result groups may include determining GUI template lists corresponding to the plurality of search result groups, and determining as a common GUI template a GUI template having a highest priority among GUI templates included in the plurality of GUI template lists or determining a certain GUI template as a common GUI template when the number of GUI template lists including the GUI template is largest. In an embodiment of the disclosure, a GUI template list corresponding to a certain search result group may include at least one GUI template appropriate for displaying search results included in the search result group. For example, a GUI template may be in a form for displaying various types of information, such as a calendar, a graph, a list, and a map, as a UI.

For example, the plurality of search result groups may include a first search result group and a second search result group. In this case, the determining, by the device, 1200 of the common GUI template for displaying the information related to the search results included in the first search result group and the second search result group may include determining a first GUI template list corresponding to the first search result group, determining a second GUI template list corresponding to the second search result group, and determining as a common GUI template a GUI template having a highest priority among GUI templates included in both the first and second GUI template lists.

In an embodiment of the disclosure, determining a common GUI template by the processor 1230 may be performed prior to categorizing a plurality of search results according to a category. For example, the processor 1230 may determine a common GUI template from a search word. The processor 1230 may determine a common GUI template according to a search purpose of a search word determined based on a text string obtained from a user. For example, when a user's search purpose is determined to 'plan a trip', the processor 1230 may determine a common GUI template to be a 'calendar' type GUI template for setting a schedule so that the user may plan a trip more effectively. The processor 1230 may directly display search results of various categories, such as airline tickets, hotels, weather and events, or display a summary thereof in the calendar-type GUI template.

In an embodiment of the disclosure, the processor 1230 may execute at least one instruction stored in the storage 1250 to display the determined common GUI template on a first region on the display 1275. The first region may be at least a region of the screen of the display 1275. In an embodiment of the disclosure, a screen of the display 1275 may include a first region for displaying a common GUI template and a second region for displaying detailed information of at least a part of search results.

In an embodiment of the disclosure, the device 1200 may select a search result group from among a plurality of search result groups and display detailed information of search results included in the selected search result group on the second region on the display 1275. For example, the selecting of a search result group from among the plurality of search result groups may include selecting a search result group having a highest priority, based on priorities of the plurality of search result groups or selecting a search result group, based on a user input.

In an embodiment of the disclosure, the processor 1230 may execute at least one instruction stored in the storage 1250 to display summary information of search results included in a plurality of search result groups in the common GUI template displayed on the first retrieve on the display 1275. For example, the device 1200 may display the summary information of the search results included in the first search result group and the summary information of the search results included in the second search result group in the common GUI template displayed on the first region on the display 1275. In an embodiment of the disclosure, summary information of search results included in a plurality of search result groups may be displayed in the common GUI template in the form of at least one of an icon, a button, text, or a graph. In an embodiment of the disclosure, a range of the summary information of the search results included in the plurality of search result groups may be determined based on at least one of search service providing history information, user information, importance of a search result, environmental information, or a screen size of a display.

In an embodiment of the disclosure, the processor 1230 may execute at least one instruction stored in the storage 1250 to determine relative priorities of a plurality of search result groups, determine whether a preset number of search results or more can be displayed on the display 1275, and select and display at least one search result group, which is to be displayed, based on the relative priorities of the plurality of search result groups when the number of search results or more cannot be displaying on the display 1275.

As described above, according to an embodiment of the disclosure, a search result with respect to an extended search word may be provided to provide not only a search result corresponding to a search word determined from a user input but also a search result with respect to associated search words. In addition, a variety of information may be provided to be viewed at a glance on a screen of a display by displaying search results of various categories in combination in a GUI template.

An embodiment of the disclosure may be embodied in the form of a non-transitory computer-readable recording medium storing instructions, such as program modules, executable by a computer. A computer-readable medium may be any available storage medium accessible by a computer and may include a volatile storage medium, a non-volatile storage medium, a removable storage medium, and a non-removable storage medium. The computer-readable medium may include a computer storage medium and a communication medium. The computer storage medium includes all of a volatile medium, a non-volatile medium, a removable medium, and a non-removable medium implemented by a method or technology for storing information such as computer-readable instructions, data structures, program modules, or other data. Generally, the communication medium may store computer readable instructions, data structures, or other data of a modulated data signal such as a program module.

The computer-readable medium may be provided as a non-transitory storage medium. The 'non-transitory storage medium' may include a tangible device and may not include a signal (e.g., electromagnetic waves) but is not intended to distinguish between a case in which data is semi-permanently stored in the storage medium and a case in which data is temporarily stored in the storage medium. For example, the 'non-transitory storage medium' may include a buffer in which data is temporarily stored.

In an embodiment of the disclosure, methods according to various embodiments of the disclosure may be provided by being included in a computer program product. The computer program product may be traded as a product between a seller and a purchaser. The computer program product may be distributed in the form of a storage medium (e.g., compact disc read only memory (CD-ROM)) that is readable by devices, may be distributed through an application store or directly between two user devices (e.g., smartphones), or may be distributed online (e.g., by downloading or uploading). In the case of an online distribution, at least part of the computer program product (e.g., a downloadable application) may be at least temporarily stored or temporarily generated in a storage medium readable by devices such as the manufacturer's server, a server of an application store, or a memory of a relay server.

The above descriptions of the disclosure are intended to provide examples, and it will be understood by those of ordinary skill in the art that modifications may be made without departing from the technical idea or essential features of this disclosure. Therefore, it should be understood that the embodiments of the disclosure described above are merely examples in all respects and not restrictive. For example, components each described as a single type may be implemented in a distributed manner, and components described as being distributed may be implemented in a combined form.

What is claimed is:

1. A method of providing an integrated search service by a device, the method comprising:
   determining a search word from an obtained text string;

determining a common graphical user interface (GUI) template based on the search word;
obtaining a plurality of search results retrieved based on the search word;
categorizing the plurality of search results into a plurality of search result groups including a first search result group and a second search result group;
displaying the common GUI template on a first region of a display among a plurality of regions of the display; and
displaying summary information of the search results included in the first search result group and summary information of the search results included in the second search result group in the common GUI template displayed on the first region of the display.

2. The method of claim 1, further comprising:
selecting a search result group from among the plurality of search result groups; and
displaying detailed information of the search results included in the selected search result group on a second region of the display among the plurality of regions of the display.

3. The method of claim 2, wherein the selecting of the search result group from among the plurality of search result groups comprises: selecting a search result group, based on an input to select one of the summary information of the search results included in the first search result group and the summary information of the search results included in the second search result group, which are displayed on the first region of the display.

4. The method of claim 1, wherein the obtaining of the plurality of search results retrieved based on the search word comprises:
obtaining an extended search word based on the search word; and
obtaining a plurality of search results retrieved based on the extended search word,
wherein a search category set corresponding to the plurality of search results retrieved based on the extended search word comprises a search category corresponding to the plurality of search results retrieved based on the search word.

5. The method of claim 1, wherein the categorizing of the plurality of search results into the plurality of search result groups comprises:
identifying a first search category and a second search category based on the search word; and
generating a first search result group based on search results included in the first search category and a second search result group based on search results included in the second search category.

6. The method of claim 1, wherein the determining of the common GUI template based on the search word comprises:
identifying a first search category and a second search category based on the search word;
determining a first GUI template list corresponding to the first search category;
determining a second GUI template list corresponding to the second search category; and
determining a GUI template of a highest priority as a common GUI template among GUI templates included in both the first and second GUI template lists.

7. The method of claim 1, wherein the determining of the common GUI template based on the search word comprises:
identifying a plurality of search categories based on the search word;
determining a plurality of GUI template lists corresponding to the plurality of search categories; and
determining, as a common GUI template, a GUI template included in a greatest number of GUI template lists among the plurality of GUI template lists.

8. The method of claim 1, further comprising:
determining relative priorities of the plurality of search result groups;
determining whether a preset number of search results or more can be displayed on the display; and
based on the number of search results or more not being able to be displayed on the display, selecting the first search result group and the second search result group, the search results of which are to be displayed on the display, based on the relative priorities of the plurality of search result groups.

9. A device configured to provide an integrated search service, the device comprising:
an inputter comprising input circuitry configured to obtain a text string;
an outputter comprising output circuitry including a display configured to display information related to at least one search result;
a storage storing a program including one or more instructions; and
at least one processor configured to execute the one or more instructions stored in the storage to:
determine a search word based a text string;
determine a common graphical user interface (GUI) template based on the search word;
obtain a plurality of search results retrieved based on the search word;
categorize the plurality of search results into a plurality of search result groups including a first search result group and a second search result group;
control the display to display the common GUI template on a first region of the display among a plurality of regions of the display; and
control the display to display summary information of the search results included in the first search result group and summary information of the search results included in the second search result group in the common GUI template displayed on the first region.

10. The device of claim 9, wherein the at least one processor is further configured to:
select a search result group from among the plurality of search result groups; and
control the display to display detailed information of the search results included in the selected search result group on a second region of the display among the plurality of regions of the display.

11. The device of claim 9, wherein the at least one processor is further configured to: obtain an extended search word based on the search word and obtain a plurality of search results retrieved based on the extended search word,
wherein a search category set corresponding to the plurality of search results retrieved based on the extended search word comprises a search category corresponding to the plurality of search results retrieved based on the search word.

12. The device of claim 9, wherein the at least one processor is further configured to:
identify a first search category and a second search category based on the search word; and
generate a first search result group based on search results included in the first search category and a second search result group based on search results included in the second search category.

13. The device of claim 9, wherein the at least one processor is further configured to:
   identify a first search category and a second search category based on the search word;
   determine a first GUI template list corresponding to the first search category;
   determine a second GUI template list corresponding to the second search category; and
   determine a GUI template of a highest priority as a common GUI template among GUI templates included in both the first and second GUI template lists.

14. The device of claim 9, wherein the at least one processor is further configured to:
   identify a plurality of search categories based on the search word;
   determine a plurality of GUI template lists corresponding to the plurality of search categories; and
   determine, as a common GUI template, a GUI template included in a greatest number of GUI template lists among the plurality of GUI template lists.

15. The device of claim 9, wherein the at least one processor is further configured to:
   determine relative priorities of the plurality of search result groups;
   determine whether a preset number of search results or more can be displayed on the display; and
   based on the number of search results or more not being able to be displayed on the display, select the first search result group and the second search result group, the search results of which are to be displayed on the display, based on the relative priorities of the plurality of search result groups.

* * * * *